United States Patent [19]

Mountain

[11] Patent Number: 4,858,375
[45] Date of Patent: Aug. 22, 1989

[54] TERMITE CONTROL APPARATUS

[76] Inventor: George Mountain, P.O. Box 251, Morresville, Ind. 46158

[21] Appl. No.: 332,536

[22] Filed: Apr. 3, 1989

[51] Int. Cl.$^4$ ............................................... A01M 7/00
[52] U.S. Cl. ...................................................... 43/124
[58] Field of Search .............. 43/124, 132.1; 239/276, 239/56 C; 47/2, 62, 79

[56] References Cited

U.S. PATENT DOCUMENTS

| | | | |
|---|---|---|---|
| 392,844 | 11/1888 | Best | 43/124 |
| 3,166,034 | 1/1965 | Haroldson et al. | 43/124 |
| 3,540,837 | 11/1970 | Pascucci | 43/124 |
| 3,589,054 | 6/1971 | Pascucci | 43/124 |
| 4,624,070 | 11/1986 | Query et al. | 43/124 |

Primary Examiner—M. Jordan
Attorney, Agent, or Firm—Robert A. Spray

[57] ABSTRACT

Applicator apparatus for termite control, including an end-pointed applicator pipe with pump means for supplying the applicator pipe with termiticide liquid under pressure; and adjacent the lower end of the pipe is a pattern or plurality of outlet holes, the holes being located in a span of about 90 degrees of the circumference of the pipe, providing an effective distribution of termiticide along the wall of the structure being treated.

5 Claims, 1 Drawing Sheet

TERMITE CONTROL APPARATUS

FIELD OF THE INVENTION

The present invention relates to the field of pest control, and more particularly to termite control apparatus.

The primary achievement of the present invention is to provide a termiticide-dispensing apparatus of a nature efficient and advantageous in a combination of ways, i.e., efficient and advantageous as to labor-saving, effectiveness of termiticide dispersion along an underground wall, economy of the termiticide, and the avoidance of contamination of the ground regions away from the wall being treated.

A further achievement is the provision of termiticide apparatus which is economical both in its construction and in its labor requirements.

Termite control has long been a vital commercial business. The annual economic loss from termites is estimated to be close to one billion dollars in this country, including not only damage but cost of treatment. Over 200,000 houses per year are treated.

Moreover, the nature of the business, and of the customers' demands and expectations, are such that a 100% success of results is required, even though the treatment is underground and not readily inspectable during the treatment procedure; and if there is any evidence of anything less from a 100% killing of termites, contractors with integrity and business-consciousness have to pay for costly re-treatments, warranty-fulfillments, etc.

Those disadvantages cannot be avoided readily, because the dispensing of an abundant extra, in order to assure a 100% kill, can run afoul of the ever-tightening governmental requirements against pollution and contamination.

The changes in termiticides through the years have caused changes in the amounts of application, and the hazards of soil-contamination of the soil away from the building site. And with increasing awareness of the vital need of better ecological considerations, a factor of increasing vitalness and of increasing awareness now for many years, optimum effectiveness of termiticide procedures has been an increasing yet unsatisfied need of the entire termite control industry.

THE INVENTION IN BRIEF SUMMARY

A hollow application pipe, having a hard pointed body at its lower end; and a pattern of outlet holes, adjacent the pointed body, is of a spread of about 90 degrees of the circumference of the pipe. This pattern of outlet holes provides for the treating of the foundation wall and ground by shooting the termiticide directly to the target area, giving effective dispersion throughout a zone of the wall yet not causing the waste and pollution effect of other dispersion patterns which disperse outwardly of the wall.

This produces, without the cost of trenching, an effective dispersion of termite-control termiticides in a safe and effective manner by placing the termiticide efficiently and effectively in the target area, i.e., the ground next to the building's foundation, and by not "over-using" the termiticide by not placing it in non-target areas which would be the case in other configurations or patterns of outlet holes.

Other details and advantages, as well as the inventive nature of the overall combination invention as a whole, will be apparent as the description proceeds.

The prior art does not show the inventive concepts, even though the prior art as to pest-control devices are quite simple as to mechanical nature, quite open to any person's inspection, quite easy to understand, etc.

The prior art as to pest control devices, as shown herein, is of many decades, even though the basic nature of equipment in this field has not basically changed in significant respects of the nature here involved.

Ground-probing injection devices, and the digging of a liquid-dispersion trench for assured termiticide liquid dispersion, have been used; and of these, the trench method is unduly costly, and the apparatus for ground-injection has not kept apace with changes in termiticide recommendations or ecology-cruciality awareness.

With this background, the significance of the combination of concepts of the present invention is to be considered by taking these factors into realistic consideration; i.e., the long use of devices in these fields, coupled with their mechanical simplicity, their openness to observation, their easy understandability by all persons, etc., which surely all combine to indicate that creativity of significantly novel articles or devices in these fields has been in fact non-obvious to untold numbers of persons for long periods of years.

This general non-creativity as to basic changes has been in spite of minor or superficial changes as to these devices over the years; and such changes emphasize the lack of the world's creativity to the basic nature improvements here conceived, for which a patent award is deserved.

In a hindsight consideration of the present invention's concepts to determine its inventive and novel nature of the invention as a whole, it is not only conceded but emphasized that the prior art had multiple details of applicators, hole-outlet patterns, etc., which could have been usable in this invention, but only if the prior art had had the guidance of the present concepts of the present invention; and even though ecology, labor savings, avoidance of waste, etc., seem to be matters of increasing awareness, the prior art has long had much motivation as to apparatus of the present invention.

A Search in the files of the U.S. Patent Office, made after this invention was conceived and during the consideration as to whether to file for patent protection, seems to emphasize the inventive nature of this invention. In the Search, the references found on the Search were:

| Smith | 2,243,510 | May 27, 1941 |
| Youngblood | 2,906,056 | Setember 29, 1959 |
| Pascucci | 3,540,837 | November 17, 1970 |
| Hollis | 3,550,542 | December 29, 1970 |
| Pascucci | 3,589,054 | June 29, 1971 |
| Renth | 4,648,202 | March 10, 1987 |

The two Pascucci patents refer to many earlier types of root feeders, which, although attempted to be adapted for termite treating, were never very effective, and required the additional process of trenching.

In addition to this drawback, chlordane, as used with these and other prior devices, is no longer legal for any use in this country under the Federal Insecticide, Fungicide and Rodenticide Act (FIFRA) as amended in 1972 and transferred from USDA to the Environmental Protection Agency (EPA). The new termiticides are much more difficult to apply, require three to four times more chemical, and are not as effective.

Therefore the application technique is required to be much more critical for best effectiveness and safety.

As is pointed out in the *Pest Control,* Feb. 1989, p. 60, 61, the termite control industry has been clamoring for a new and more effective method of applying ground termiticides.

Yet, until the present applicator apparatus, and in spite of the need, the industry has not achieved or created a new tool to apply these very restricted chemicals in an effective manner, while still staying within the legal boundries set by EPA as to the total maximum and minimum gallonage on each job.

The prior tools referred to as prior art in Pascucci's patents fail to do this. They did not even work for chlordane, and they are even more inadequate for the newer chemicals.

Another problem of the apparatus of the Pascucci apparatus was their attempt to be useful for both termite control and also waterproofing; but termite control has only a minor relation to waterproofing. For example, termite water supply can be far away as 100' from the house, and 50' deep. EPA's termite control standards make no reference to waterproofing basement walls, nor did USDA when they had the FIFRA since 1946, nor did USDA's Forrest Service, which had written termite control standards since 1929. Many of their factors are quite different.

Another problem with the apparatus of the Pascucci devices was their use of holes going in four directions, including a 360-degree dispersion. That may be suitable for root feeding; but in applications of the present termite control liquid, three of the holes will not only be wasting of termiticide, but the one hole which would be aimed at the target (i.e., the foundation wall) will not prove effective in controlling termites. And of special importance to EPA, three holes, or 75% of the chemical, will produce an "over-application"; and, since it will not be aimed at the target foundation, will produce pollution and contamination, outwardly from the structure, possibly resulting in heavy fines and even license suspension. (All of the states have enacted EPA type state laws that closely mirror the Federal Environmental Pesticide Control Act (FEPCA).)

The 1987 Renth device is a piercer of a wall cover or baseboard, piercing type injection principles which would have no application for liquid termiticides injected into the soil. It could never be adapted for termite control because of its flimsy construction and low volume. The needle is inherently too flimsy, and the holes are not properly spaced, again resulting in an illegal and ineffective application outwardly of the building being treated.

The needle is also not nearly the length required for a termite control soil-injector.

This Renth apparatus was never widely accepted by the pest control industry.

Youngblood's apparatus is intended to be used exclusively on ants. The termite nest, however, cannot be located in the ground; and thus this Youngblood device is not only different from the present invention, the Youngblood device would not be effective for termite control.

As to Youngblood (and other prior devices) it should be noted that the principal behind termite control (as outlined in the old USDA Forest Service Bulletins down to the recent EPA Publications) all prescribe coating the outside of the foundation wall and the ground next to it with termiticide. This is to prevent termites from coming to the foundation and then climbing up the inside or outside of the foundation to the wood structure.

The Youngblood "splash shield" disc also prevents this devices's rod from being inserted deep enough to effect adequate termite-control treatment to the basement or footing walls as the target area, even if the holes were correctly placed for termite control, which they are not (four holes on a 360 span), shown above to be undesirable for present-day termite control.

The Smith apparatus has little or no significance to the termite control industry. The Smith devices is a poison gun, intended to be used exclusively for the dissemination of dusts into rodent burrows; and it could not be adapted for liquid dispersal. The single aperture for sub-surface dispersal does not lend itself to pressure application, and is different from the aperture pattern of the present invention.

The Hollis rodent and gopher control device is not designed nor adapted for termite-control liquid application, for there is no pellet or dust treatment for termites. Thus, its details, such as a single large-size discharge window, are not only different from the present invention, but this Hollis device would not be looked to for termite control apparatus suggestions.

Further it is emphasized that the prior art has had several particulars of prior art ability and motivation which individually and accumulatively help show the non-obviousness of this combination invention as to its various features:

Forming and shaping procedures and know-how as to objects of metal and plastics; knowledge of combination articles; and ground-probes, root-feeders, waterproofing applicators, etc., as well as various devices for pest control, etc.

With the reality of all these factors, the inventive non-obviousness of the present invention is quite manifest.

The prior art has had features of the present invention, and approaches to its concepts, but not in the combination by which the invention as a whole is advantageously achieved.

The background of prior art as just summarized seems more significant in showing the non-obviousness of the present concepts when also it is reminded that the prior art also had long provided and long used principles of combination articles and combination concepts as to many types of devices, and the prior art long realized that "combination" concepts were quite desirable in various devices, for a variety of uses; and metal-shaping and other material-forming and other manufacturing procedures are well known by which all components of the present invention could have been made, if the prior art had had the specific concepts of the invention.

And the existence of such articles embodying such various features is not only conceded, it is emphasized; for as to the novelty here of the combination, of the invention as considered as a whole, a contrast to the prior art helps show both the great variety of the various prior art attempts of improvement, and the advantages and the inventive significance of the present concepts. Thus, as shown herein as a contrast to all the prior art, the inventive significance of the present concepts as a combination is emphasized, and the nature of the concepts and their results can perhaps be easier understood.

Although varieties of prior art are conceded, and ample motivation is shown, and full capability in the prior art is conceded, no prior art shows or suggests details of the overall combinations of the present invention, as is the proper and accepted way of considering the inventiveness nature of the concepts.

That is, although the prior art shows an approach to the overall invention, of particularly many types and styles of pest-control devices, it is significant that none of the prior art shows the novel and advantageous combination, which provides the merits of this ivention, even though certain details are shown separately from this accomplishment.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art of all relevant fields.

BRIEF DESCRIPTION OF THE DRAWINGS

The above description of the novel and advantageous invention is of somewhat introductory and generalized form. More particular details, concepts, and features are set forth in the following and more detailed description of illustrative embodiments, reference being had to the accompanying generally diagrammatic and schematic drawings, in which.

DETAILED DESCRIPTION OF ILLUSTRATIVE EMBODIMENT

Figures 1, 2, 3:
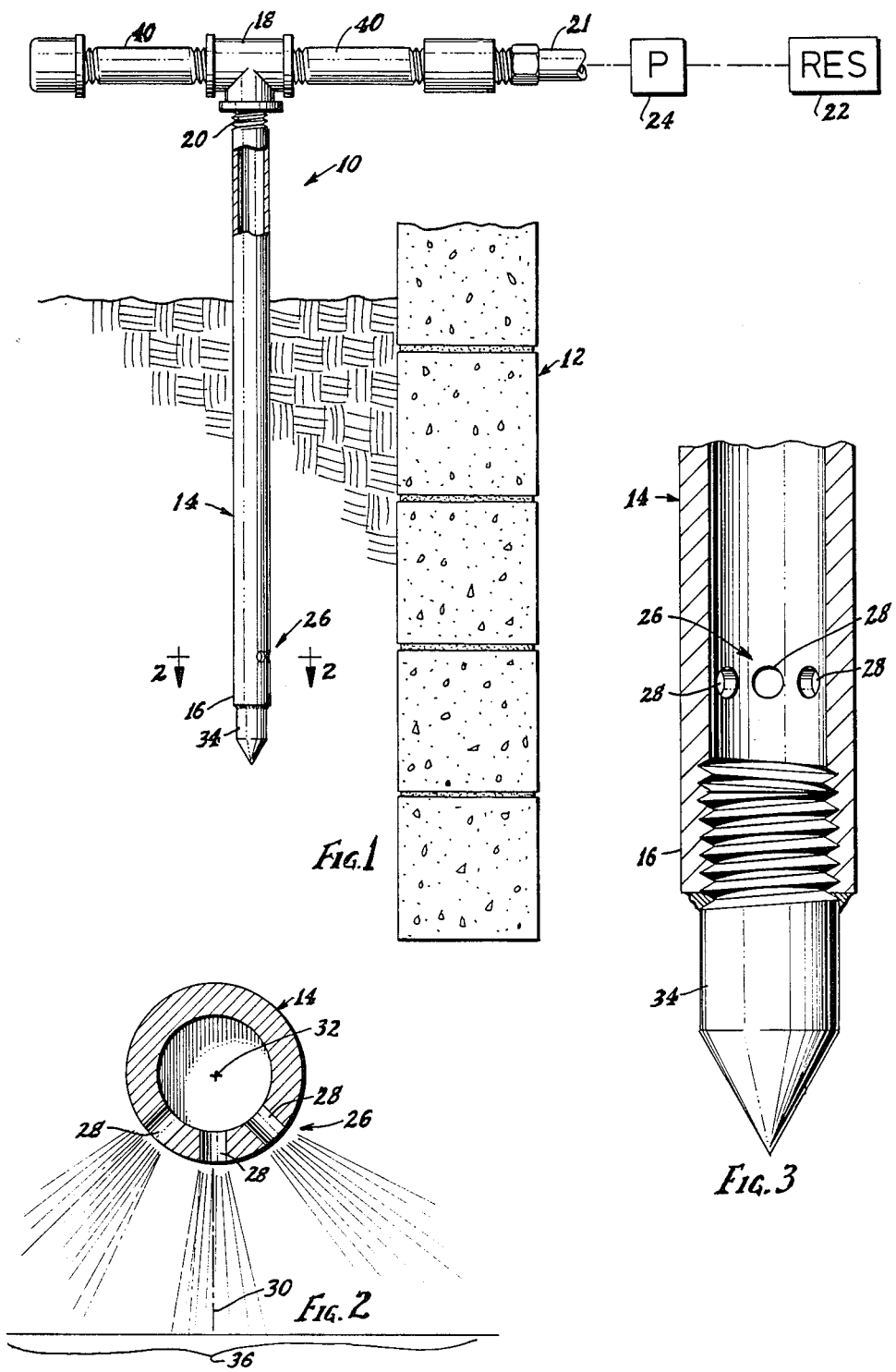
FIG. 1 is an elevation view of a termiticide applicator in use, supplied with termiticide from an associated source; and is shown as pushed into the ground adjacent an underground footing being treated.
FIG. 2 is a cross-sectional view, generally as taken by Section-line 2—2 of FIG. 1, through the outlet holes.
FIG. 3 is an enlarged detail view of the lower end of the applicator or dispenser device.

As shown in the drawings, the present invention provides a combination device having special features and special function, i.e., the provision of an applicator apparatus 10 for applying termite control liquid to sites adjacent an underground structure 12 such as a building footing whose periphery is to be treated. More particularly, the apparatus 10 is shown as comprising an applicator pipe 14, shown pointed at its lower end for ease of penetration into the ground; and the pipe 14 is hollow throughout its span from its lower end 16 to a supply fitting 18 adjacent its upper end 20.

Termiticide liquid for the pipe 14 comes through a flexible line 21, from a reservoir 22 of termite control liquid, and pump means 24 is indicated for supplying the applicator pipe 14 with control liquid under pressure.

According to concepts of the invention, there is provided a pattern 26 or plurality of holes 28 in the wall of the applicator pipe 14 at a location closely adjacent its lower end 16; and it is to be particularly noted that the holes 28 are located along about 90 degrees of the circumference of the pipe 14; and this provides, if the pipe 14 is inserted into the ground adjacent a planar wall of the structure 12, and with the plurality 26 of holes 28 directed generally toward the wall of the structure 12, the holes will aim control liquid being dispensed through the holes 28 up to about 45 degrees from a line 30 perpendicular to the wall 12 and passing through the center 32 of the pipe 12.

Even more particularly in a desired embodiment, and as shown, there are three of outlet holes 28; and they are equally spaced throughout the 90 degree span.

Desirably, the holes 28 are about 3/16 inch in diameter.

As best shown in FIG. 3, the pointed extreme lower end of the pipe 14 is provided by a pointed body member 34, and the body member 34 is provided with male threads on its upper portion, and the pipe 14 being provided with female threads on its lower end 16.

SUMMARY AND UTILITY DESIGNATIONS

The primary concepts of the overall combination are the particulars of the pattern 26 of holes 28, for that is what provides the primary advantages. That is, the limited circumferential spacing provides effective termiticide dispersion over a zone 36 of the structure 12 but does not direct any outwardly of the structure, thus conserving liquid and avoiding undue contamination, all without trenching along the wall.

The direction of the holes 28 is radial of the pipe 14, minimizing clogging of the holes 28 during either ground-penetration, as the user pushes down on the pipe 14 by pushing down on the short nipples 40 attached to side-bodies of the tee 18 atop the pipe 14, or as the pipe 14 is being pulled from the ground; and the holes 28 as shown are all on the same level, assuring thoroughness and substantial uniformity of coverage along the span or zone 36.

After dispersion sufficient to cover the zone 36 of structure 12, the user withdraws the pipe 14, and reinserts it into the ground for an adjacent zone 36, etc.

CONCLUSION

It is thus seen that termite control apparatus, as provided and used according to the inventive concepts herein set forth, provides novel concepts of a desirable and advantageous device, yielding the advantages of an termiticide applicator device having advantageous details and features, which, in overall combination, is conceptually different from the prior art articles even though various objects embodying certain of the mechanical details as a basic capability have of course been known for years; yet significantly this particular combination, even considered as including or building on prior art concepts, has not been suggested by the prior art, this achievement being a substantial and advantageous departure from prior art, all this even though the prior art shows attempts at improvement and variations as to devices for applicators for various purposes for many years. And particularly is the overall difference from the prior art significant when the non-obviousness is viewed by a consideration of the subject matter as a whole, as integrally incorporating a combination of features as different from the prior art, in contrast to merely the details of novelty themselves, and further in view of the prior art teaching away from the particular and inter-related concepts and features of the present invention.

In summary as to the nature of these advantageous concepts, their inventiveness is shown by novel features of concept and construction shown here, in novel and advantageous combination, not only being different from all the prior art known, but because the achievement is not what is or has been suggested to those of ordinary skill in the art, especially realistically considering this as comprising components which individually are similar in nature to what is well known to makers and users of various termiticide dispenser devices for many years. No prior art has suggested the modifications of any prior art to achieve the novel concepts here achieved, with the various features providing their own functions in the overall combination; and this is particularly significant since these devices are objects whose mechanisms are easy and apparent to observe, and have been no doubt observed by most all persons of the pest-control industry.

Accordingly, it will thus be seen from the foregoing description of the invention according to this illustrative embodiment, considered with the accompanying drawings, that the present invention provides new and useful concepts of a novel and advantageous combination termite control apparatus yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

I claim:

1. Applicator apparatus for applying termite control liquid to sites adjacent a structure whose periphery is to be treated, the apparatus comprising:
    an applicator pipe, pointed at its lower end for ease of penetration into the ground, and hollow throughout its span from its lower end to a supply fitting adjacent its upper end;
    a reservoir of termite control liquid, and pump means for supplying the applicator pipe with control liquid under pressure;
    in such an apparatus, the improvement comprising, in combination:
    the provision of a plurality of holes in the wall of the applicator pipe at a location closely adjacent its lower end;
    the holes being located along about 90 degrees of the circumference of the pipe, providing, if the pipe is inserted into the ground adjacent a planar wall of a structure, and with the plurality of holes directed generally toward the said wall, the holes will aim control liquid being dispensed through the holes up to about 45 degrees from a line perpendicular to the wall and passing through the center of the pipe.

2. An applicator apparatus as set forth in claim 1 in a combination in which there are three of said holes, equally spaced throughout the 90 degree span.

3. An applicator apparatus as set forth in claim 1 in which the holes are about 3/16 inch in diameter.

4. An applicator apparatus as set forth in claim 1 in which all the holes are at generally the same distance from the lower end of the pipe.

5. An applicator apparatus as set forth in claim 1 in which the pointed lower end of the pipe is provided by a pointed body member; and the body member is provided with male threads on its upper portion, and the pipe is provided with female threads on its lower end.

* * * * *

UNITED STATES PATENT AND TRADEMARK OFFICE
CERTIFICATE OF CORRECTION

PATENT NO.   :   4,858,375
DATED        :   August 22, 1989
INVENTOR(S)  :   George Mountain It is certified that error appears in the above-identified patent and that said Letters Patent is hereby corrected as shown below:

Col. 2, l. 1-4:   These lines should be printed as a heading for the subsequent text.

Col. 4, l. 12:    Change "devices" to:   -- device --.

Col. 4, l. 40-43: These lines should be printed as a heading for the subsequent text.

Col. 5, l. 11:    Change "ivention" to:   -- invention --.

Signed and Sealed this

Third Day of September, 1991

*Attest:*

HARRY F. MANBECK, JR.

*Attesting Officer*          *Commissioner of Patents and Trademarks*